(No Model.) 3 Sheets—Sheet 3.
N. RUBENSTEIN.
CLOTH CUTTING MACHINE.
No. 521,003. Patented June 5, 1894.
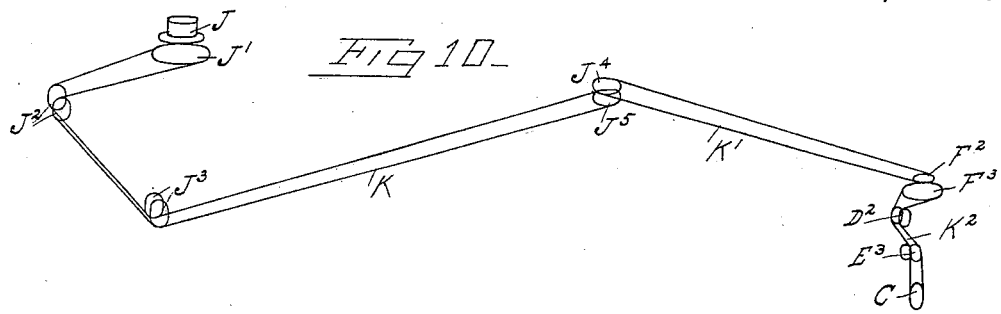
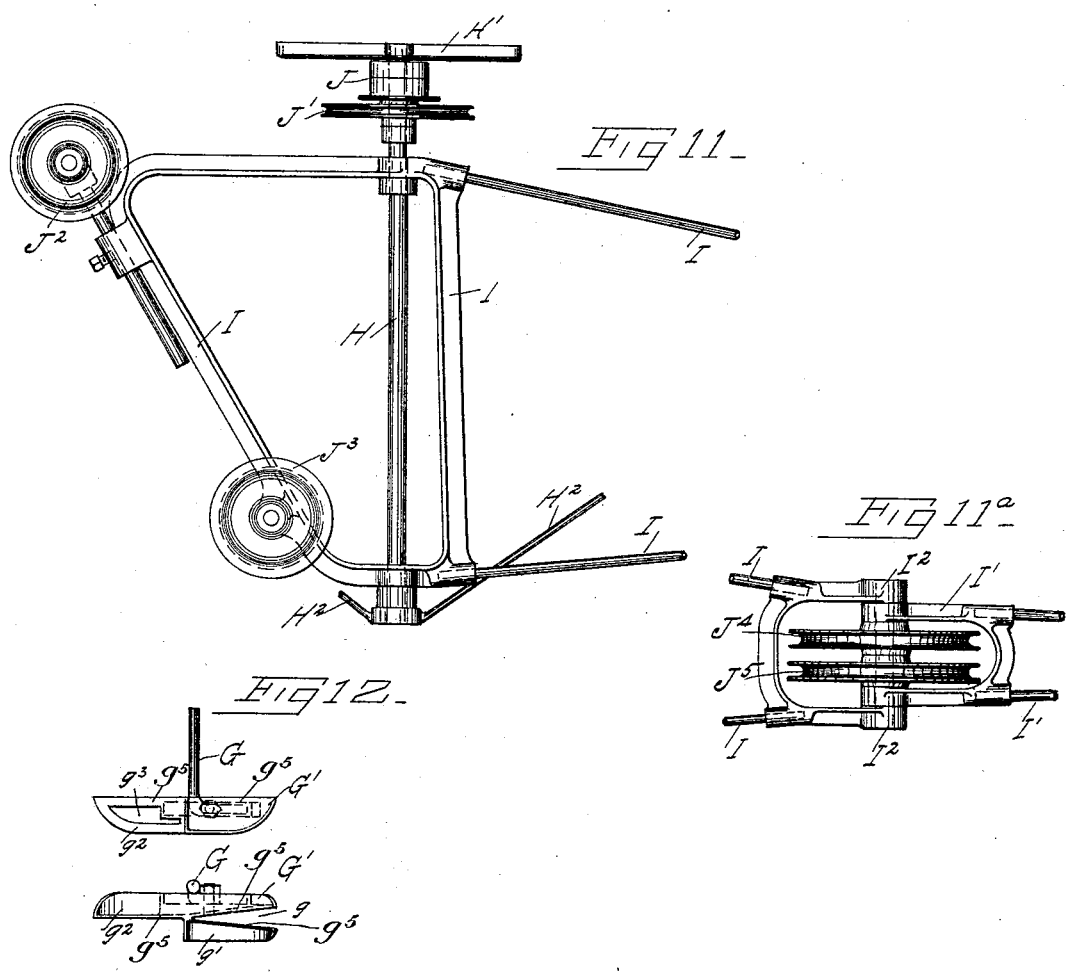
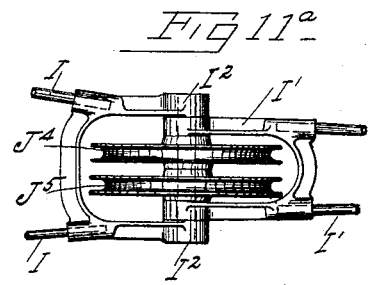
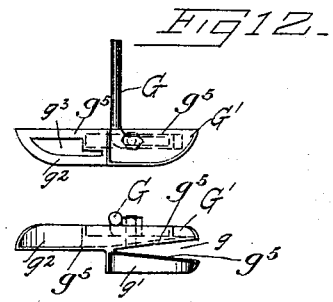
WITNESSES.
Annie M. Adams.
Maurice Conway.
INVENTOR-
Nathan Rubenstein
By Jno H Whipple
Atty

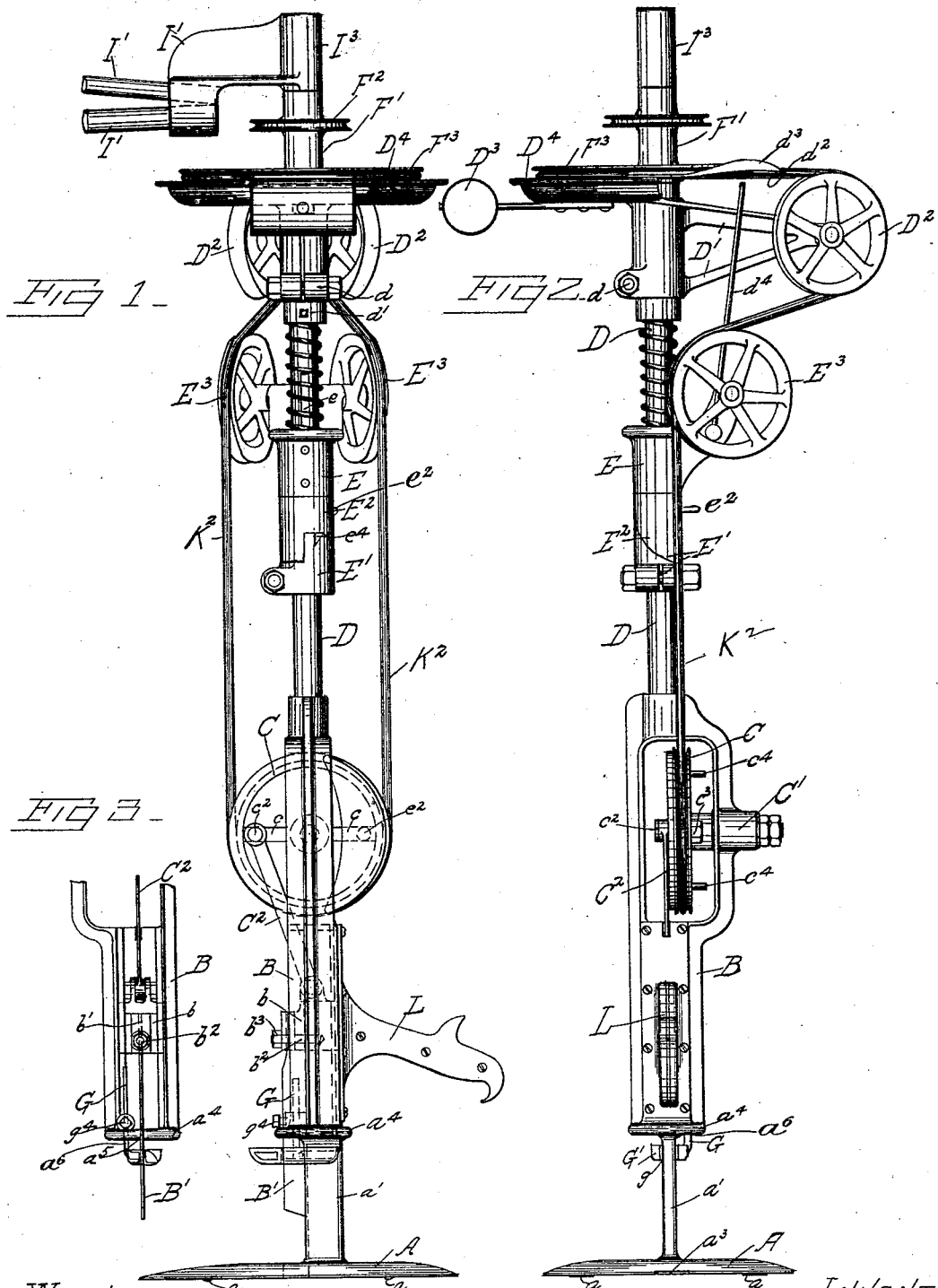

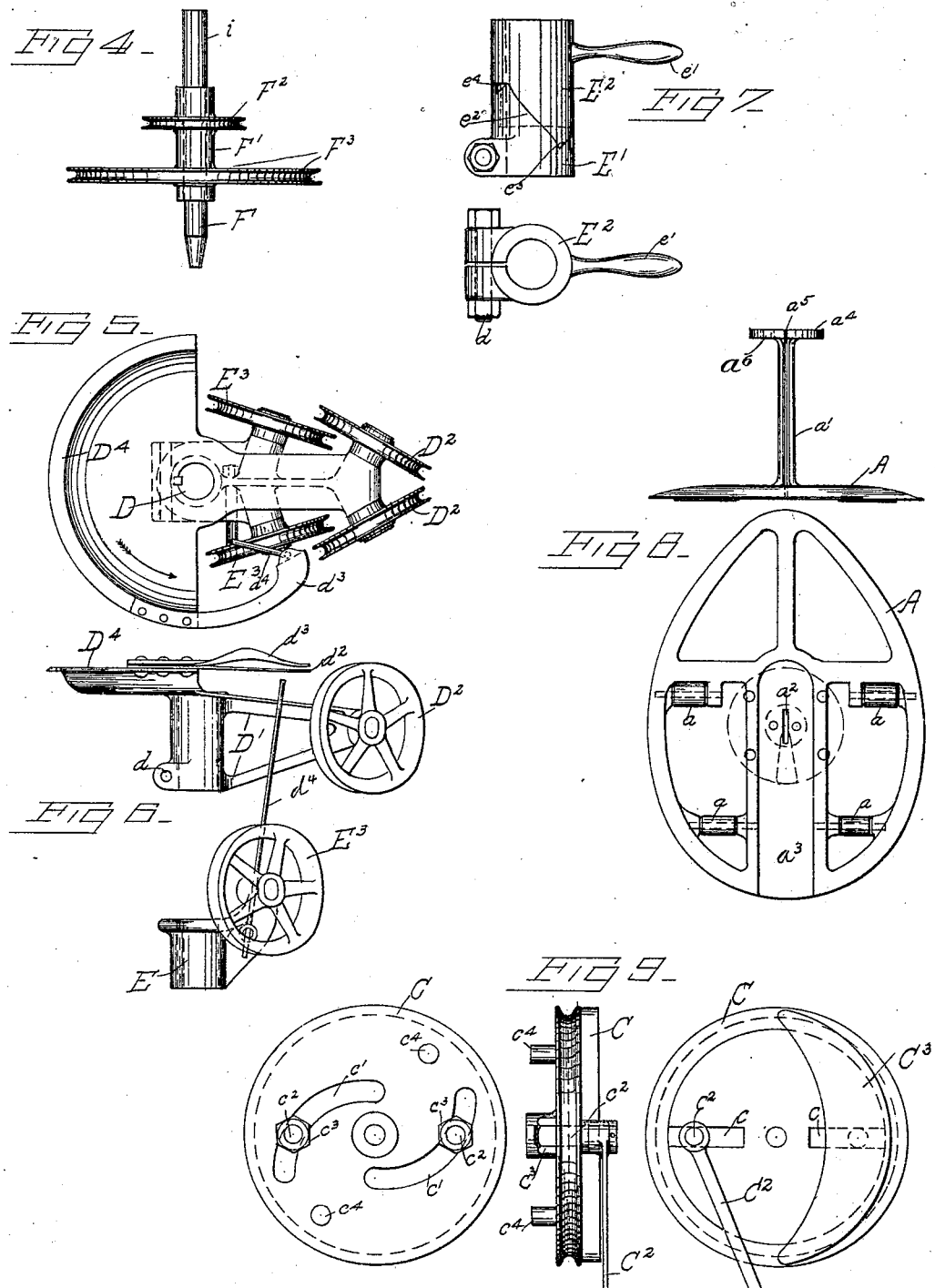

UNITED STATES PATENT OFFICE.

NATHAN RUBENSTEIN, OF CHICAGO, ILLINOIS.

CLOTH-CUTTING MACHINE.

SPECIFICATION forming part of Letters Patent No. 521,003, dated June 5, 1894.

Application filed April 24, 1893. Serial No. 471,538. (No model.)

*To all whom it may concern:*

Be it known that I, NATHAN RUBENSTEIN, of Chicago, in the State of Illinois, have invented certain new and useful Improvements in Cloth-Cutting Machines, of which the following is a specification.

My invention relates to improvements in cloth cutting machines in which a vertically reciprocating cutter is employed to cut several patterns at one operation upon several layers of cloth; and one of the objects of my improvements is to provide means for preventing jumping of the machine in operation.

Another object is to provide means for readily adjusting the stroke of the cutter to different heights corresponding with varying depths of cloth to be cut.

Another object is to provide means for conveniently applying the operating power to the cutter.

Another object is to provide means for giving the machine great sweep or movement over the table or tables upon which it is to be operated.

Another object is to provide improvements in the details of the construction and arrangement of parts as hereinafter more particularly specified. I attain these objects by the means shown in the accompanying drawings, in which—

Figure 1 is a side elevation of a machine embodying my invention. Fig. 2 is a rear elevation of the same. Fig. 3 is a fragment of a front elevation. Fig. 4 is a detail showing in side elevation a detached pulley-spindle with pulleys fixed to a loose sleeve thereon. Fig. 5 is a top or plan view of the machine, omitting the part shown in Fig. 4. Fig. 6 is a detail showing, in perspective, detached brackets for supporting pulleys. Fig. 7 is a detail showing a side elevation and a top view of a cam-piece. Fig. 8 is a detail showing a bottom view of the base and a front edge view of the same with the standard. Fig. 9 is a detail showing obverse sides and an edge view of a pitman-wheel. Fig. 10 is a diagrammatic view showing the course of the operating belts, and the position of the pulleys for supporting the same in the complete machine. Fig. 11 is a detail showing, in fragment, a side elevation of a revoluble pulley support and the hanger for attaching it to the ceiling. Fig. 11$^a$ is a side elevation of a detail showing a fragment of the pulley supports at the point where they are jointed together. Fig. 12 is a detail showing a side elevation and a top view of a presser foot.

In the drawings, A is the base of the machine, having rollers $a$ on the under side for carrying it on the operating table. It has a grooved standard $a'$, an opening $a^2$ for the cutter to pass through and a groove $a^3$ extending from the opening $a^2$ back and out at the rear edge for allowing the dust of cutting to pass out. The top of the standard is provided with a plate or flange $a^4$ which has a slot in the front edge, corresponding in position with the groove of the standard, for the cutter to work in. To the flange $a^4$ there is secured a slotted piece or frame B between whose members at the lower part is mounted in grooves a slide $b$ for working the cutter. The front edge of the slide has a groove $b'$ for receiving the rear edge of the cutter blade B'. A slotted pin $b^2$ is secured in the slide, the slot corresponding in position with the groove of the slide, and extending out through the end of said pin, the outer end being threaded so that when the cutter blade is put in the slot it may be secured in place by a nut $b^3$ on the outer end of said pin, said nut being adapted to clamp the opposite parts of the pin against the sides of the cutter blade and to impinge the outer edge of the same in order to hold it securely in place. This construction also affords means for conveniently raising or lowering the cutter blade and securing it in the newly adjusted position, or taking it out of the machine.

In the upper part of the frame B is mounted a pitman-wheel C having its journal bearing at C' in one side of said frame, and connected by the pitman C$^2$ with the slide. The pitman-wheel is composed of two disks fitted together, one mounted loosely on the shaft and having opposite radial slots $c$, and the other fixed to the shaft and having slots $c'$ commencing on opposite sides of its center and running obliquely across said radial slots toward the periphery. The pitman and a counterbalance C$^3$ are attached to the pitman-wheel by bolts $c^2$ passing through both of the slots $c$ and $c'$, and being fastened therein by means of a nut $c^3$ on said bolts adapted to clamp together the slotted disks comprising said pitman-wheel. The pitman and counterbalance are thus adjustably secured at opposite points of pitman-wheel equi-distant from its center; and the point of attachment may readily be varied by loosening said nuts and turning one of said disks upon the other so as to make the slots of said disks cross nearer to or farther from the center, accordingly as a greater or less extent of motion of the slide is desired. The disk which is mounted loosely on the shaft is provided with a pin or pins $c^4$ for holding it or moving it while the other is turned in order to vary the intersection of said slots relatively to the center of the pitman-wheel for the purpose mentioned; and the opposite disk is flanged so as to cover the periphery of the other one, and its periphery is adapted to receive the driving belt.

To the upper part of the frame-piece B, I attach a tube D which is extended upward and receives on its upper end the bracket D' which supports a pair of pulleys $D^2$ counterbalanced by a weight $D^3$ at the opposite side of said bracket. The bracket D' is secured to the tube B my means of a split sleeve provided with lugs adapted to be clamped together by a screw bolt $d$ so as to compress the sleeve upon said tube, or by means of set screws $d'$. Farther down on said tube is a sliding bracket E which has a spline adapted to work in a slot $e$ of said tube; and still lower down is a clamp E' attached to said tube, similarly to the bracket D'. Between the parts E and E' there is a part $E^2$ provided with a handle $e'$. The lower edge of the part $E^2$ and upper edge of the part E' meet or fit together on correspondingly irregular surfaces as shown by the line of separation seen in Figs. 1, 2 and 7, one portion $e^2$ being inclined, so that when the part $E^2$ is rotated on the rod D it will raise the part E through the instrumentality of the inclined or cam surface $e^2$ until a lip $e^3$ on the part $E^2$ is made to engage in a notch $e^4$ in the part E' to hold said part E' in elevated position. Said bracket E, supports a pair of tension pulleys, $E^3$, which are designed to tighten or loosen the driving belt by means of the raising and lowering thereof; notch $e^4$ being slanted in the opposite direction so that after said handle $e'$ has been turned in the direction to raise bracket E, it may turn in the opposite direction to release the lip from said notch and let the bracket down. I prefer to use a coiled spring upon said tube, as shown in Figs. 1 and 2, between the parts D' and E. The upper part of the bracket, D', is provided with a semi-circular flange $D^4$, having on one side projecting clamps, $d^2$ and $d^3$, for holding the driving belt when not under tension. A rod $d^4$, attached to the bracket E and having its upper end adapted to strike the under side of the clamp $d^3$, is provided for raising said clamps when the bracket E is raised so as to release the driving belt as it is put under tension by the raising of the pulleys, $E^3$. The open end of the tube, D, takes a spindle, F (shown in Fig. 4) which carries a loose sleeve, F', having fixed pulleys, $F^2$ and $F^3$, said sleeve resting upon the open end of the tube D. The driving belt passes around the pulley $F^3$, extends down over the pulleys $D^2$ behind the pulleys $E^3$ and thence down around the pitman-wheel. It is of sufficient length to extend loosely around the pulley $F^3$ and be held in place by the clamps $d^2$ and $d^3$ and be thereby kept in place when the tension is not on, but by raising the bracket E, the tension will be applied and the clamps taken off to put the machine in operation. By this means the pulley $F^3$ may be in continuous operation and the cutter may be stopped or started as required in use, by operating the handle, $e'$ for tightening the belt over the pulleys and releasing the clamps thereon.

The flange, $a^4$, is provided with an opening, at $a^6$ by the side of the slot $a^5$, through which the rod G, which supports the presser foot G', passes; said presser foot has a V-slot $g$, the rear part of which is adapted to fit over the standard $a'$ and the front part of which to cover the cutter blade. On one side of the presser foot there is a flange or guard $g'$, for preventing the fingers of the operator from coming in contact with the cutter when in operation. The front part, $g^2$, of said presser foot is projected straight in front of the cutter blade and to one side of the line of cut, leaving the cloth on the opposite side of the line open to view so that the mark can be seen. The presser foot is also turned up in front so as to slide over the cloth and is provided with an opening, $g^3$, so that the light will not be obstructed or prevented from falling upon the mark on the cloth which ever side of the machine is presented to the light. A small set screw, $g^4$, impinges the rod G for holding the presser foot in its most elevated or lowered position. The presser foot comprises a thin horizontal plate curved upward at both ends and a vertical, strengthening plate $g^5$ integral with the horizontal plate and having the opening $g^3$ in its front part.

Referring to Fig. 11, H designates a vertical rod provided with a plate H' whereby it is secured to the ceiling or some suitable support overhead in the room where the machine is to be operated and having brace rods $H^2$ connected to its bottom and to the ceiling for suitably bracing the same against lateral strain. A revoluble jointed pulley support consisting of the parts I and I', jointed at $I^2$ and having one end provided with a socket at $I^3$ into which the top end $i$ of the spindle F is fitted so that the tube D and its connected parts extending down to the base A, will afford a support for the extreme end of said jointed pulley support. On the top of the rod H is mounted loosely a sleeve provided with an idle and a fixed pulley J, and also a fixed pulley J'; said idle and fixed pulley J being adapted to receive the power belt.

The part I of the pulley support is provided with a pair of adjustable pulleys J² and a pair of stationary pulleys J³ and pulleys J⁴ and J⁵.

The diagrammatic view (Fig. 10) shows the relative arrangement of said pulleys together with the pulleys before described as a part of the machine itself, and the arrangement of the operating belts thereon. One of said belts, K, passes round the pulley J', over the pulleys J², under the pulleys J³ and around the pulley J⁵. Another belt K' passes around pulleys J⁴ and F² and another belt K² passes around the pulley F³, over the pulleys D² and E³ and around the pitman-wheel C, the arrangement being such that the jointed pulley support I and I' is freely revoluble on the spindle F without disturbing the arrangement or in any way interfering with the operation of said belts upon their respective pulleys within a wide sweep. The height of the machine, when resting on the table, is sufficient to bring the belts K and K' way above the head of the operator and the machine is free to be moved upon the operating table or tables in any direction within the sweep of the jointed pulley support. The braces H², which support the rod H, are to be arranged with reference to the position of the tables in the operating room so as not to interfere with the general movement of the jointed pulley support covering that part of the operating room where the tables are situated.

The machine is provided with a handle L secured to the part B at the rear for moving the machine upon the table in the operation of cutting the cloth. The cutter, B', is provided with a cutting edge on the bottom only so that the cutting is done by a succession of chops or blows striking the cloth on the top and penetrating it through to the bottom. The cutter is adjusted so that it will pass through the slot, a², and just clear the operating table. The presser foot is adapted to rest down and slide upon the top layer of cloth to keep it down against the upward movement of the cutter blade. It is capable of being adjusted to a height four inches above the surface of the base plate A and from thence down nearly to said base, and the cutter by means of the adjustment of the knife on the slide and the adjustment of the stroke of the pitman on the pitman wheel can be made to cover the entire space between the highest adjustment of the presser foot and the upper surface of the base plate and is thereby made capable of cutting a pile of cloth fully four inches high and of being readily adjusted from that down to the height of only a few layers of cloth above the base plate with equal facility, a result which has not to my knowledge been accomplished in any prior cloth cutting machine. My said machine also possesses superior means for stopping and starting the cutter blade only without throwing out of gear the power belts or machinery which drives the other parts of the machine.

Having thus fully described my invention, what I claim, and desire to secure by Letters Patent, is—

1. A cloth-cutting machine comprising a slotted base provided with a vertical standard, a frame mounted on said standard and having vertical guides, a reciprocating slide adapted to said guides and provided with means for attaching the cutter thereto, a pitman and its crank shaft mounted on said frame the pitman being connected with said slide, a rod also mounted on said frame and being in a vertical line coincident with the right line of said standard, and the mechanism for operating the pitman mounted on said rod, the whole being balanced so as to stand upright by means of the lateral support furnished by the base resting upon a level surface as specified.

2. A cloth-cutting machine comprising a slotted base provided with a vertical standard, a frame mounted on said standard, vertical guides on said frame, a reciprocating slide provided with means for attaching the cutter thereto, a crank shaft, and pitman connected with said slide, a vertical rod mounted on said frame in vertical line coincident with the right line of said standard, mechanism for operating the crank shaft mounted on the upper part of said rod and connected with the crank shaft, and means mounted on said rod between its ends for throwing said mechanism out of gear with the crank shaft, the whole being balanced so as to stand upright by means of the lateral support furnished by said base resting upon a level surface as specified.

3. A cloth-cutting machine comprising a base, a vertical standard and frame, guides on said frame, a reciprocating slide provided with means for attaching a cutter, a crank shaft and pitman connected with said slide a vertical rod having its lower end mounted on said frame in a line coincident with the vertical line of said standard, mechanism mounted on the upper end of said rod and connected by a belt with a pulley on the crank shaft, and a sliding bracket carrying a tension pulley mounted on said rod between its ends and means substantially as shown for sliding said bracket on said rod as specified.

4. A cloth-cutting machine comprising a base, a vertical standard and frame, guides on said frame, a reciprocating slide provided with means for attaching a cutter, a crank shaft and pitman connected with the slide, a vertical rod connected at its lower end with said frame in a line coincident with the vertical line of said standard, mechanism mounted on the upper end of said rod and connected by a loose belt with a pulley on the crank shaft, a clamp on said belt for checking the same, a sliding bracket on said rod carrying a tension pulley adapted to bear on said belt and an arm adapted to impinge said clamp, and means substantially as shown for sliding said bracket to release said clamp and tighten said belt as specified.

5. A cloth-cutting machine comprising a slotted base, a vertical standard, a frame having vertical guides, a slide adapted to said guides and provided with means for attaching a cutter, a crank shaft and pitman connected with said slide, a vertical rod mounted on said frame in a line coincident with the vertical line of said standard, a horizontal pulley on the upper part of said rod connected by a belt with a pulley on the crank shaft, a pair of clamps supported on said vertical rod in plane with said horizontal pulley and means substantially as shown mounted on said vertical rod for simultaneously releasing said clamps and tightening said belt as specified.

6. In a cloth cutting machine, the combination with the grooved standard $a'$ having a slotted plate $a^4$ mounted thereon, and the slide $b$ provided with a slotted pin $b^2$ having a nut, and the cutter blade, the latter having its upper end adjustably secured to the slide by means of said slotted pin and its nut and being adapted to work in the groove of said standard through the slot of said slotted plate as specified.

7. The combination with the frame and the reciprocating slide and pitman and its shaft mounted on the frame, of a pitman-wheel and counter-balance, said pitman-wheel comprising a fixed and a loose disk, on the pitman shaft, having intersecting slots at opposite sides of the axis, with bolts therein for adjustably securing the pitman and counter-balance to the pitman-wheel as specified.

8. In a cloth cutting machine, the standard provided with a groove for guiding the cutter and a plate $a^4$ having a slot coincident with said groove, in combination with the presser foot having a slot at the rear adapted to fit over said standard and a rod G passing through an opening in said plate $a^4$ by the side of the slot therein and a screw impinging said rod for adjusting the presser foot at different heights on the standard as specified.

9. The presser foot comprising a horizontal plate provided with a V-slot in its rear and curved upward at both ends, the rear part $g'$ forming a finger guard laterally to a line coincident with the line of the adjacent edge of the part $g^2$ produced to the rear of the presser foot, a vertical strengthening plate $g^5$ having its lower edge and ends connected with said horizontal plate and its upwardly curved ends, and being provided with an opening $g^3$ in its front part, and a connecting rod G as specified.

NATHAN RUBENSTEIN.

Witnesses:
ANNIE M. ADAMS,
MAURICE CONWAY.